United States Patent [19]

Vaughan

[11] Patent Number: 4,985,127
[45] Date of Patent: Jan. 15, 1991

[54] ELECTRODIALYTIC CONVERSION OF MULTIVALENT METAL SALTS USING SULFONATE IONS

[76] Inventor: Daniel J. Vaughan, 36 Paxon Dr., Wilmington, Del. 19803

[21] Appl. No.: 459,131

[22] Filed: Dec. 29, 1989

[51] Int. Cl.$^5$ .............................................. B01D 61/44
[52] U.S. Cl. .................................. 204/182.4; 204/301
[58] Field of Search .................. 204/182.3, 182.4, 301, 204/100

[56] References Cited

U.S. PATENT DOCUMENTS

| | | | |
|---|---|---|---|
| 2,921,005 | 1/1960 | Bodamer | 204/182.4 |
| 3,310,481 | 3/1967 | Mock et al. | 204/182.4 |
| 3,382,164 | 5/1968 | Webb et al. | 204/182.4 |
| 3,788,960 | 2/1973 | Patil et al. | 204/100 |
| 4,617,097 | 11/1986 | Nobel et al. | 204/54.1 |

*Primary Examiner*—John F. Niebling
*Assistant Examiner*—Arun S. Phasge
*Attorney, Agent, or Firm*—Shlesinger & Myers

[57] ABSTRACT

Multivalent metal cations in aqueous solution are electrotransported efficiently and with high capacity through cation permeable membranes into an aqueous solution containing a sulfonate ion which makes possible a simple electrodialytic process for conversion of all salts of multivalent metal cations into the respective acids or halogens of the anions of the salts and into water soluble salts or water insoluble salts or ionically immobile compounds of the multivalent metal cations. The use of a sulfonate ion the acid of which in a one normal solution would have a pH no greater than three (3) prevents fouling of the membrane and makes electrodialytic conversion of especially salts of barium, strontium, calcium and lead simple, efficient and with high capacity without the formation of undesirable products of electrolysis at the cell anode or cathode.

11 Claims, No Drawings

ELECTRODIALYTIC CONVERSION OF MULTIVALENT METAL SALTS USING SULFONATE IONS

FIELD OF THE INVENTION

This invention relates broadly to the electrodialytic conversion of multivalent metal salts in aqueous solutions. More specifically this invention relates to the use of a soluble anion of an acid in the catholyte or solution receiving electrotransported multivalent metal cations in the electrodialytic conversion of salts in aqueous solutions. Specifically, this invention comprises the use of a soluble sulfonate anion in a catholyte or aqueous solution receiving electrotransported multivalent metal cations to facilitate the electrotransport of barium, calcium, lead, strontium and other cations through cation permeable membranes. The sulfonate anion facilitates the electrotransport of essentially all multivalent metal cations and provides a simple, efficient, high capacity electrodialytic process for conversion of multivalent metal salts.

One embodiment of the process of this invention relates to an electrodialytic process comprising an electrodialytic cell having an anolyte compartment and a catholyte compartment separated by a cation permeable membrane. The anolyte compartment contains an anode and an aqueous solution comprising a soluble salt of a multivalent metal cation. The catholyte compartment contains a cathode and an aqueous solution of a soluble anion of a sulfonic acid which acid in a one normal solution would have a pH no greater than three and forms a water soluble salt of a multivalent metal cation. The electrodialytic process is especially applicable for the conversion of multivalent cation salts of barium, calcium, lead, strontium and other multivalent cations that form substantially water insoluble salts with sulfate anions.

Another embodiment of the process of this invention relates to an electrodialytic process comprising an electrodialytic cell having at least three compartments that are separated by cation permeable membranes. The cell has an anolyte compartment containing an anode and an aqueous solution comprising salts of mono and multivalent cations, a reactor compartment containing an aqueous solution of a soluble salt of a sulfonic acid which acid in a one normal solution would have a pH no greater than three and forms a water soluble salt with a multivalent metal cation and agents that ionically immobilize multivalent metal cations and a catholyte compartment containing a cathode and an aqueous solution of monovalent cation hydroxide. The multivalent metal cations in the reactor compartment are ionically immobilized by insolubilization or formation of chelates and complex compounds with negative or no electrical charge. This embodiment is especially useful for the separation of multivalent and monovalent metal cations.

BACKGROUND OF THE INVENTION

Electrodialysis is a well known art (see U.S. Pat. Nos. 4,325,792; 4,439,293; 4,636,288; 4,080,270, the disclosures of which are incorporated by reference). Electrodialysis is the transport of ions through ion permeable membranes as a result of an electrical driving force. The process is commonly carried out in an electrochemical cell having a catholyte compartment containing a cathode and a catholyte and an anolyte compartment containing an anode and an anolyte, the catholyte and anolyte compartments being separated by ion permeable membranes. There is always in every electrodialytic process some small degree of reverse migration of cations through anion permeable membranes and/or anions through cation permeable membranes. Oxidations occur at the cell anode and reductions at the cell cathode.

The electrodialytic processes as disclosed in my U.S. Pat. Nos. 4,325,792; 4,439,293; 4,636,288 provide a method for electrotransport of multivalent metal cations through cation permeable membranes to effect the electrodialytic conversion of multivalent metal salts with and without admixture with monovalent metal salts. These processes are now used broadly in the industry, with satisfactory results. There are, however, uses where the anion required to form a soluble salt with a multivalent metal cation to facilitate electrotransport of the multivalent cation is unstable at the cell cathode or the anion reverse migrates to the feed electrolyte or anolyte and is undesirable or is converted to an undesirable gas at the cell anode. There are also mixtures of multivalent metal salts where two or more anions are required in the catholyte or electrolyte receiving the multivalent metal cations to effect electrotransport of the multivalent metal cations without fouling the ion transport of the cation permeable membrane. If there was an anion of one acid that would facilitate the electrotransport of all multivalent metal cations through cation permeable membranes and if this anion was stable in the electrodialytic process and reverse migration was minimal, all multivalent metal salts and mixtures could be electrodialytically converted to the acids or halogen of the salt anion and the hydroxides or insoluble salts of the multivalent metal cations in a simple, high capacity electrodialytic process.

Acids are used broadly in the chemical, electronics, mining, electroplating and metal finishing industries wherein the acids react with metals and other salts to form salts of multivalent cations and anions of the respective acids. Often, there are salts of several multivalent metal cations and different anions in solutions. For example, in chromic acid solutions used to electroplate chromium, the anodes of lead, tin and antimony dissolve to form salts, barium carbonate is used to adjust the concentration of sulfate catalyst, strontium is added regulate or form a limited solubility catalyst, magnesium silicon fluoride is added as a co-catalyst or inhibitor, chemicals enter the chromic acid solution on parts to be plated, parts are dissolved or etched into the solution and calcium and other salts are added with make-up water. To purify and restore the plating solution, all metal cations must be removed and all desirable anions left in the chromic acid solution. If chloride ions are used to facilitate the electrotransport of the multivalent metal cations, the chloride adversely affects electroplating if it reverse migrates it is converted to chlorine at the cell anode. If nitrate ions are used, they can be converted to ammonium cations or ammonia gas in the catholyte and would be undesirable if the nitrate ions reverse migrate into the chromic acid solutions. Based on available data, it would be surprising if there was an anion of one acid that would facilitate the electrotransport of all of the ionically mobile multivalent metal cations from the chromic acid solution through a cation permeable membrane. More surprising would be that barium salts can be electrodialytically converted by electrotransport of barium cations through a cation permeable membrane having sulfonic acid groups fixed to a polymer matrix into an electrolyte containing a soluble sulfonate anion.

It is an object of the instant invention to provide a simple, efficient, reliable high capacity electrodialytic process for the electrodialytic conversion of barium, lead, calcium, strontium and other multivalent metal salts and mixture of salts using a soluble anion of a sulfonic acid to facilitate electrotransport of the multivalent metal cations from an electrolyte through a cation permeable membrane.

SUMMARY OF THE INVENTION

This invention provides a simple high capacity electrodialytic process for electrotransport of multivalent metal cations of barium, lead, calcium, strontium and essentially all other multivalent cations through a cation permeable membrane without fouling the ion transport of the membrane by using in the catholyte or electrolyte receiving the multivalent metal cations a soluble anion of a sulfonic acid which acid in a one normal solution would have a pH no greater than three and forms a water soluble salt of a multivalent metal cation. The sulfonate anion is more stable in electrodialysis than the nitrate anion which can be reduced at the cell cathode and reverse migration of the sulfonate anion into the cell anolyte does not result in forming an undesirable gas such as chlorine formed by chloride ions. The result is a simple, versatile, high capacity electrodialytic process for conversion of essentially all salts.

DETAILED DESCRIPTION OF THE INVENTION

For a multivalent metal cation to be electrotransported through a cation permeable membrane, it must be soluble (ionically mobile) in a solution, enter the membrane at the interface of the solution and membrane, be ionically mobile through the polymer membrane structure and exit the membrane into an aqueous solution. Unfortunately, all ionically mobile multivalent metal cations that enter the membrane must be electrotransported through and out of the membrane or the ion transport of the membrane decreases with time of electrodialysis. The number of ion transport sites on a cation permeable membrane separating solutions in an electrodialytic cell is very small in comparison with the number of multivalent metal cations in the electrolyte being fed to the cell and only parts per billion of a multivalent metal cation that forms an insoluble salt on or in the membrane structure can, in time, substantially reduce the ion transport capacity of the membrane. To preclude loss of ion transport and capacity of the electrodialytic process it is essential that any ionically mobile multivalent metal in a feed electrolyte be electrotransportable through the membrane. Barium, lead, calcium, strontium cations form substantially insoluble salts with sulfate anions and soluble salts with nitrate, chloride and acetate ions. Although nitrate and chloride ions can be used to electrodialytically convert salts of barium, lead, calcium and strontium and mixtures of these salts, the nitrate ions can be reduced to ammonia in the catholyte especially in the presence of copper ions and the reverse migration of the nitrate ion is, at times, undesirable. Reverse migration of the chloride ion, if not undesirable, is converted to chlorine at the cell anode.

It has now been found that high cell capacity can be achieved and retained when electrodialytically processing solutions of barium, calcium and other salts and mixtures of salts by the use of a soluble anion of a sulfonic acid in the catholyte or electrolyte receiving the electrotransported multivalent cations. The sulfonate anion is surprisingly effective in electrotransport of barium and calcium ions and preventing fouling of the membrane and loss of cell capacity while electrotransporting high concentrations of the multivalent cations for extended periods.

Any soluble anion of a sulfonic acid, which acid in a one normal solution would have a pH no greater than three and forms a water soluble salt of a multivalent metal cation can be used in the electrodialytic process of this invention. The salt formed with the multivalent metal cation need only be slightly water soluble; i.e., sufficient to minimize formation of insoluble multivalent metal salts in and on the membrane; a solubility of at least 2000 ppm is preferred. The preferred soluble anions of sulfonic acids are anions which acids in a 0.1 normal solution would have a pH less than three and more preferably of two or less and form water soluble salts with multivalent cations preferably with all multivalent cations in the feed or anolyte of an electrodialysis cell. Mixtures of anions of different sulfonic acids and mixtures of anions of sulfonic acids and soluble anions of other acids, preferably acids of sulfur, can be used to effect and maintain cell capacity.

The concentration of the soluble anion of a sulfonic acid in an aqueous solution receiving the electrotransported multivalent cations or catholyte can be varied over a wide range, from a saturated solution to about 0.5 wt. %. It is preferable to use a concentration of the soluble anion sufficient to operate at the cell capacity, (current density) and cell voltage desired. If the reverse migration of the sulfonate anion adversely effects the quality of the feed or anolyte, it is preferable to use a low concentration of the sulfonate anion and adjust electrical conductivity with sodium carbonate, sodium hydroxide or other salts of acids. As will be apparent to one skilled in the art, the concentration of the soluble sulfonate anion must be sufficient to minimize the membrane fouling tendency of the ions or agents in the aqueous solution or catholyte that insolubilize multivalent metal cations.

The electrodialytic cells of this invention can have two or more compartments. A two compartment cell has an anolyte compartment and a catholyte compartment separated by a cation permeable membrane. The anolyte compartment has an anode and an aqueous anolyte comprising a soluble salt of a multivalent cation or mixture of salts of multivalent or monovalent cations and anions. The catholyte compartment has a cathode and an aqueous catholyte comprising a soluble sulfonate anion which forms a water soluble salt of a multivalent metal cation. A three compartment cell has an anolyte compartment, a reactor compartment and a catholyte compartment separated by cation permeable membranes. The anolyte compartment has an anode and an aqueous solution comprising a salt of a multivalent cation. The reactor compartment has an aqueous solution comprising a soluble sulfonate anion and agents to ionically immobilize the multivalent cations. The catholyte compartment has a cathode and an aqueous solution comprising a soluble hydroxide, carbonate or bicarbonate or an aqueous acidic solution, or an aqueous solution comprising a soluble salt of a sulfonic acid, and agents to insolubilize multivalent cations. A three compartment cell can have an anolyte compartment, a feed compartment and a catholyte compartment separated by cation permeable membranes. The anolyte can be an aqueous acidic solution and the feed an aqueous solution comprising a soluble salt of a multivalent metal cation and the catholyte an aqueous solution comprising a soluble anion of a sulfonic acid preferably with agents to insolubilize multivalent metal cations. Cells of this invention that have more than three compartments can be separated by all cation permeable membranes or combinations of cation, anion, bipolar membranes and porous separators, provided that the membrane between the anolyte and next compartment is selectively cationic. It will be apparent to one skilled in the art, that the soluble anion of a sulfonic acid, which acid in a one normal solution has a pH no greater than three is used to facilitate the electrotransport of multivalent metal cations through cation permeable membranes into aqueous solutions preferably comprising agents that insolubilize or ionically immobilize multivalent cations and the soluble anion of a sulfonic acid should be used in those compartments, wherein this condition exists. It will also be apparent to those skilled in the art that the compartments between the feed or anolyte compartments comprising a salt of a multivalent metal cation and the catholyte compartment must be in electrical communication with the cathode and the compartments must be separated by separators that are permeable to cations.

The multivalent cations are ionically immobilized as water insoluble salts, chelates and complex compounds with a negative or no electrical charge. There are a large number of agents that can be used to ionically immobilize multivalent metal cations, such as soluble hydroxides, acids and soluble salts of oxalic, hydrofluoric, phosphoric acids, hydrogen sulfide, alkali sulfide, thiosulfates, polymeric acids and ion exchange resins.

Any cation permeable membrane can be used to separate the compartments of the electrodialytic cells of this invention. These cation permeable membranes have fixed negative charges distributed in the polymer matrix and are permeable to positively charged ions. The membranes are preferably hydrocarbon and halocarbon polymers containing acids and acid derivatives Particularly suitable are perhalocarbon polymers containing sulfonic acid groups.

This invention is for the electrodialytic processing of multivalent cations and mixtures of mono and multivalent cation salts in aqueous solutions and uses a soluble anion of a sulfonic acid which acid in a one normal solution would have a pH no greater than three in the catholyte or an aqueous solution in electrical communication with the cathode of an electrodialytic cell. Aqueous solutions of salts of multivalent cations are found throughout the industry and comprise essentially all multivalent metal cations. The processes of this instant invention are especially useful where the aqueous solutions comprise salts of barium, lead, calcium, strontium and other multivalent metal cations that form substantially insoluble salts with sulfate ions.

One embodiment of the process of this invention is the electrodialytic conversion of multivalent metal salts comprising the electrotransport of multivalent metal cations through cation permeable membranes into aqueous solutions comprising a soluble anion of a sulfonic acid. To illustrate the practice of this aspect of the instant invention an electrodialytic cell was assembled having an anolyte compartment containing an anode, a reactor or feed compartment and a catholyte compartment containing a cathode. The compartments were separated by cation permeable membranes. The cell had an electrolysis area of 6.75 square inches and was equipped for continuously adding a feed solution comprising salts of multivalent cations to the anolyte or feed and reactor compartment and for removing solids from the reactor or catholyte compartment and return of the reactor or catholyte solutions to the cell compartments. The anode was a titanium mesh with a ruthenium oxide coating and the cathode was a titanium mesh with a nickel coating. The cation permeable membranes were NAFION perfluorinated 417 membranes obtained from the DuPont Company. The total anode to cathode gap was 0.4 inches, the cell temperature was 60° C., and the current density one ampere per square inch of membrane area. Cell voltage was varied to maintain current density. The d.c. power supply was custom made and equipped to operate at constant current and variable voltage.

Each experimental example comprises a series of experiments wherein the catholyte composition remained essentially the same except for insolubilized multivalent metal cations and the composition of the anolyte and reactor compartment compositions varied as described below. An increase in cell voltage during the electrodialysis indicates fouling of the membrane and loss of cell capacity.

EXAMPLE I

In the three compartment cell, a 5 wt. % solution of barium acetate was added to the anolyte compartment, a 10 wt. % solution of sodium methane sulfonate, adjusted with sodium hydroxide to a pH of 10 was added to the reactor compartment, and a 10 wt. % solution of sodium methane sulfonate was added to the catholyte compartment. Electric current was passed through the cell, the pH of the reactor solution was controlled by the addition of sodium hydroxide at a pH of 10 to 10.5. The initial voltage was 5.1 and after four (4) hours, the voltage was 4.9 indicating no fouling of membranes. A white solid was filtered from the reactor solution, there was some barium electrotransported to the catholyte. Sodium sulfate was added to the reactor compartment solution to maintain a ratio of methane sulfonate to sulfate of about 20, the catholyte was replaced with a new solution and the electrolysis continued. The initial voltage was 5.0 and remained between 4.9 and 5.0. White solids (barium hydroxide - barium sulfate) were removed from the reactor solution and only a trace of a white solid was removed from the catholyte. After three hours, the reactor compartment solution was changed to a 10 wt. % sodium sulfate solution adjusted to a pH of 10 with sodium hydroxide. The initial cell voltage was 4.8 and the voltage increased rapidly to 25 volts, maximum for output, indicating essentially complete fouling of the membrane between the anolyte and reactor compartments. The d.c. power was turned off, the reactor compartment solution replaced with a 10 wt. % solution of sodium methane sulfonate, and the electrolysis started. The cell voltage decreased to 5.0 with transport of barium ions to the reactor compartment. After 30 minutes, the experiment was terminated, the reactor solution changed to a 3 wt. % solution of methane sulfonic acid and the electrodialysis resumed. The cell voltage was 4.8 and remained essentially constant. A white solid (barium hydroxide) was removed from the catholyte solution. The reactor solution remained essentially free of solids. After two hours, the experiment was terminated. The anolyte was changed to a 10 wt. % solution of nitric acid containing about fifty (50) grams per liter of lead (dissolved as PbO); five (5) grams/liter of barium (dissolved as barium carbonate); ten (10) grams per liter of calcium (dissolved as calcium hydroxide); and five (5) grams/liter of cupric nitrate. The reactor solution was a 10 wt. % solution of sodium methane sulfonate adjusted to a pH of 10 with sodium hydroxide. Electric current was passed through the cell. The initial voltage was 4.6 and decreased slowly over a period of three hours to 4.5. Solids removed from the reactor solution contained lead, calcium, barium and copper. There were traces of white solids in the catholyte solution and the catholyte contained some dissolved calcium and barium ions. The catholyte was replaced with a new solution and sodium sulfate and sodium oxalate were added to the reactor solution at a rate to maintain soluble sulfate and oxalate ions (about 0.01 wt. % in the solution). The cell voltage was 4.6–4.4 and essentially constant. Solids removed from the reactor solution contained lead, calcium, barium and copper. The catholyte solution was essentially free of solids and multivalent cations. The catholyte solution was changed to a 5 wt. % solution of sodium hydroxide and the electrodialysis continued with maintenance of the reactor solution at a pH of 9.5 to 10.5 and control of sulfate and oxalate. The cell voltage was 4.4 and remained essentially constant until the electrodialysis was stopped, about 3.5 hours.

EXAMPLE II

The electrodialytic cell of Example I was converted to a two compartment cell by removing the reactor compartment and separating the anolyte and catholyte compartments with a Nafion* perfluorinated membrane 324 obtained from the DuPont Company. The nitric acid, lead, barium, calcium and copper solution of Example I was fed to the anolyte compartment containing an Ebonex* reduced oxides of titanium ceramic anode and a 10 wt. % solution of sodium methane sulfonate was fed to the catholyte compartment containing a cathode of a copper mesh coated with nickel. Electric current was passed through the cell and the electrolysis was continued for one hour. The voltage was initially 4.0 and decreased to 3.8. Solids of barium, lead, calcium and copper hydroxides were removed from the catholyte. There was no visible solid on or in the membrane. The catholyte was changed to a 10 wt. % solution of sodium p-toluene sulfonate and the electrolysis continued. The initial voltage was 4.3 and declined to 4.0 after about 30 minutes. Solids containing barium, lead, calcium and copper were removed from the catholyte. There was no apparent fouling of the membrane, the voltage remained at 3.9 to 4.0, and the electrolysis was terminated after two hours. The solution of p-toluene sulfonic acid was removed from the cell and replaced with a seven (7) wt. % solution of sodium tri fluoromethane sulfonate and the electrolysis started. The initial voltage was 4.5 volts and decreased to 4.3 volts as operation reached steady state. There was no apparent fouling of the membrane in two hours of electrolysis and the electrodialysis was terminated. Solids removed from the catholyte contained barium, lead, calcium and copper.

EXAMPLE III

The electrodialytic cell of Example II with related equipment was used. The Nafion 324 membrane was replaced by a Nafion 417 perfluorinated membrane and the cathode was changed to a 316 stainless steel mesh cathode. The anolyte compartment was filled with a solution containing 10 wt. % chromic acid, 0.1 wt. % sulfuric acid, 5 grams/liter of calcium ion, 7 g/l of $Fe^{+++}$ ions, 5 g/l of $Al^{+++}$, 3 g/l of $Zn^{++}$, 4 g/l $Cu^{++}$, to which was added 1 g/l of magnesium silicon fluoride and 1 g/l of lead acetate and the catholyte compartment was filled with a 10 wt. % solution of sodium methane sulfonate. Electric current was passed through the cell at a current density of one (1) ampere per square inch of membrane area. The initial voltage was 5.3 and remained essentially constant until termination of the experiment. Solids removed from the catholyte (hydroxides of metal cations) contained calcium, aluminum, iron, copper, zinc, magnesium and traces of lead, barium and chromium. The electrodialysis was terminated after about one hour and the catholyte solution changed to a 3 wt. % solution of methane sulfonic acid. The initial voltage was 3.8 and remained constant for about thirty (30) minutes and then increased with time of electrodialysis to 4.1 volts when some of the catholyte was removed and replaced with new solution to control the concentration of soluble salts. Metals electrodeposited on the cathode. After about one hour of electrodialysis, metal deposition resulted in a plate through of the membrane and loss of hydraulic integrity. The electrodialysis was terminated.

These results show the effectiveness of using a soluble anion of a sulfonic acid which acid in a one normal solution would have a pH no greater than three to facilitate the electrotransport of multivalent metal cations, such as, barium, calcium, and lead, through cation permeable membranes and the conversion of multivalent metal salts to the acid or halogen of the salt anion and a hydroxide or ionically immobile salt or complex of the multivalent metal cation. The sulfonate anion is substantially stable to electrodialytic conditions and reverse migration through membranes does not result in an undesirable gas at the cell anode. The sulfonate anion provides a simple electrodialytic process for processing essentially all salts of multivalent metal cations and mixtures of salts of mono and multivalent metal cations.

I claim:

1. A process for the electrodialytic conversion of salts of multivalent metal cations in an aqueous solution into the acid of the salt anion or a halogen if the salt anion is halide, said aqueous solutions being selected from solutions comprising cations of barium, strontium, calcium, lead and other cations that form substantially water insoluble salts with sulfate anions and said salts and salts of other multivalent and monovalent cations, which comprises electrotransporting at least multivalent metal cations from said aqueous solution through a cation permeable membrane into a second aqueous solution containing a sulfonate anion that forms a water soluble salt with barium, strontium, calcium, lead and other cations that form substantially water insoluble salts with sulfate anions.

2. The process of claim 1, wherein said second aqueous solution contains (a) a soluble sulfonate anion the acid of which in a one normal solution would have a pH no greater than three and forms a water soluble salt of all said multivalent metal cations and (b) an agent capable of reacting selectively with said multivalent metal cations to form ionically immobile substances selected from precipitates, complexes and chelates of said multivalent metal cations.

3. The process of claim 1 wherein said soluble sulfonate anion in said second aqueous solution is selected from sulfonic acids which in a one normal solution would have a pH no greater than two.

4. The process of claim 1 wherein said soluble sulfonate anion is methyl sulfonate, trifluoromethyl sulfonate, p-toluene sulfonate.

5. The process of claim 1 wherein said second aqueous solution comprises soluble hydroxyl, carbonate or bicarbonate ions or mixtures thereof which react with said multivalent metal cations to form precipitates.

6. A process using an electrodialysis cell for the electrodialytic conversion of salts of multivalent metal cations in a first aqueous solution as an anolyte into the acid of the salt anion or halogen if the salt anion is a halide which comprising passing an electric current through said electrodialysis cell and electrotransporting metal cations including said multivalent metal cations from said first aqueous solution containing said salts in a first compartment of said electrodialytic cell through a cation permeable membrane into a second compartment containing a second aqueous solution comprising a soluble sulfonate anion of an acid which acid in a one normal solution has a pH no greater than three and forms a water soluble salt with barium, strontium, calcium, lead and other cations that form substantially water insoluble salts with sulfonate anions said aqueous solution in said second compartment being in electrical communication with the cathode of said electrodialysis cell.

7. The process of claim 6 wherein said soluble sulfonate anion is a sulfonate anion selected from sulfonic acids which in a one normal solution would have a pH no greater than two.

8. The process of claim 6 wherein said soluble sulfonate anion is methyl sulfonate, trifluoromethyl sulfonate, p. toluene sulfonate.

9. The process of claim 6 wherein said second aqueous solution comprises agents that react with multivalent metal cations to form ionically immobile compounds selected from precipitates, complexes and chelates of multivalent metal cell.

10. The process of claim 6 wherein said second aqueous solution is in contact with the cathode of said electrodialytic cell.

11. The process of claim 6 wherein said second aqueous solution comprises soluble hydroxyl, carbonate or bicarbonate ions or mixtures thereof which react with said multivalent metal cations to form precipitates.

* * * * *